United States Patent
Lee

(10) Patent No.: US 11,650,811 B2
(45) Date of Patent: May 16, 2023

(54) METHOD OF UPDATING CONTROL UNIT FOR VEHICLE

(71) Applicant: HYUNDAI AUTOEVER CORP., Seoul (KR)

(72) Inventor: Deok Joo Lee, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 192 days.

(21) Appl. No.: 17/101,530

(22) Filed: Nov. 23, 2020

(65) Prior Publication Data

US 2021/0157578 A1    May 27, 2021

(30) Foreign Application Priority Data

Nov. 26, 2019 (KR) .......................... 10-2019-0153807
Dec. 17, 2019 (KR) .......................... 10-2019-0168432

(51) Int. Cl.
| | |
|---|---|
| *G06F 16/23* | (2019.01) |
| *G06F 8/658* | (2018.01) |
| *G06F 8/65* | (2018.01) |
| *G06F 8/71* | (2018.01) |

(Continued)

(52) U.S. Cl.
CPC ................ *G06F 8/71* (2013.01); *G06F 8/654* (2018.02); *G06F 9/544* (2013.01);
(Continued)

(58) Field of Classification Search
CPC . G06F 8/71; G06F 8/654; G06F 9/544; G06F 12/0246; G06F 12/0891; G06F 11/0739; G06F 11/00; G06F 16/29; G06F 8/65; G06F 8/658; G06F 8/66; G06F 9/445; G06F 11/0709; G06F 11/0742;
(Continued)

(56) References Cited

U.S. PATENT DOCUMENTS

2008/0059601 A1* 3/2008 Yoshikawa ........... H04L 69/324
                                                                                709/212
2013/0006925 A1* 1/2013 Sawai ..................... G06F 16/29
                                                                                707/E17.005

(Continued)

FOREIGN PATENT DOCUMENTS

| JP | 6568947 B2 | 8/2019 |
|---|---|---|
| KR | 100729525 B1 | 6/2007 |

(Continued)

OTHER PUBLICATIONS

Hafizah et al., Don't Brick Your Car: Firmware Confidentiality and Rollback for Vehicles, 2015 IEEE, [Retrieved on Nov. 23, 2022], Retrieved from the internet: <URL: https://ieeexplore.ieee.org/stamp/stamp.jsp?tp=&arnumber=7299907> 10 Pages (139-148) (Year: 2015).*

(Continued)

*Primary Examiner* — Anibal Rivera
(74) *Attorney, Agent, or Firm* — Lempia Summerfield Katz LLC

(57) ABSTRACT

Disclosed is a method of updating a control unit for a vehicle, the method including: generating raw difference data by comparing an old version of data with a new version of data; generating divided difference data by dividing the raw difference data for each memory sector; and updating the old version to the new version by using the divided difference data.

20 Claims, 22 Drawing Sheets

(51) Int. Cl.
  *G06F 8/654* (2018.01)
  *G06F 12/0891* (2016.01)
  *G06F 12/02* (2006.01)
  *G06F 9/54* (2006.01)
  *G06F 9/445* (2018.01)
  *G06F 11/07* (2006.01)
  *G06F 11/34* (2006.01)

(52) U.S. Cl.
  CPC ...... *G06F 12/0246* (2013.01); *G06F 12/0891* (2013.01); *G06F 8/65* (2013.01); *G06F 8/658* (2018.02); *G06F 8/66* (2013.01); *G06F 9/445* (2013.01); *G06F 11/0709* (2013.01); *G06F 11/0739* (2013.01); *G06F 11/0742* (2013.01); *G06F 11/0793* (2013.01); *G06F 11/3495* (2013.01)

(58) Field of Classification Search
  CPC ............... G06F 11/076; G06F 11/0793; G06F 11/1004; G06F 11/1433; G06F 11/3409; G06F 11/3495; G06F 19/29; G06F 19/11; G06F 19/23
  See application file for complete search history.

(56) References Cited

U.S. PATENT DOCUMENTS

| | | | | |
|---|---|---|---|---|
| 2016/0344705 | A1* | 11/2016 | Stumpf | H04L 9/3213 |
| 2017/0307383 | A1* | 10/2017 | Kubo | G06F 16/11 |
| 2018/0046395 | A1* | 2/2018 | Sekimoto | G06F 3/0643 |
| 2018/0246711 | A1* | 8/2018 | Kurosawa | G06F 8/65 |
| 2019/0138298 | A1* | 5/2019 | Teraoka | B60R 16/02 |
| 2019/0347249 | A1* | 11/2019 | Sekiguchi | G08G 1/137 |

FOREIGN PATENT DOCUMENTS

| | | |
|---|---|---|
| KR | 20080083512 A | 9/2008 |
| KR | 10-2019-0071875 A | 6/2019 |
| KR | 10-2019-0074346 A | 6/2019 |

OTHER PUBLICATIONS

Office Action cited in corresponding Korean patent application No. KR10-2019-0168432; dated Nov. 18, 2020; 8 pp.

* cited by examiner

FIG. 4C

| SECTOR 1 OLD VERSION REFERENCE ADDRESS |
| SECTOR 2 OLD VERSION REFERENCE ADDRESS |
| SECTOR 3 OLD VERSION REFERENCE ADDRESS |

REFERENCE DATA

| SAME | SIZE |
|---|---|
| DELETE | SIZE |
| ADD | SIZE |
| DATA ||

SA1_U

SECTOR 1 DIFFERENCE

| ADD | SIZE |
|---|---|
| DATA ||
| SAME | SIZE |
| DELETE | SIZE |
| CHANGE | SIZE |
| DATA ||
| SAME | SIZE |
| DELETE | SIZE |
| SAME | SIZE |

SA2_U

SECTOR 2 DIFFERENCE

| SAME | SIZE |
|---|---|
| DELETE | SIZE |

SA3_U

SECTOR 3 DIFFERENCE

⋮ ← DDD

METHOD OF UPDATING CONTROL UNIT FOR VEHICLE

CROSS-REFERENCE TO RELATED APPLICATIONS

This application claims priority to and the benefit of Korean Patent Application No. 10-2019-0153807, filed on Nov. 26, 2019 and Korean Patent Application No. 10-2019-0168432, filed on Dec. 17, 2019, the entire contents of which are incorporated herein by reference.

FIELD

The present disclosure relates to a method of updating a control unit for a vehicle. More particularly, the present disclosure relates to a method of updating a control unit for a vehicle, which updates software or information of a control unit for a vehicle by a difference updating method.

BACKGROUND

The statements in this section merely provide background information related to the present disclosure and may not constitute prior art.

Currently, various electronic devices for user convenience are applied to vehicles according to technology development, and there is an update technology for updating software or information of a Micro Controller Unit (MCU) for a vehicle for controlling various electronic devices.

For example, Over-The Air (OTA) update technology is capable of wirelessly, instead of wired, updating software of information of the MCU for the vehicle.

In another form, a difference update technology updates only a changed part among the entire data for updating software of various electronic devices, and the difference update technology requires a support of a high-capacity memory and a high-specification central processing unit.

The difference update technology is the technology commonly used in Android or Linus file systems that operate based on a high-specification Application Processor (AP).

However, since the MCU for the vehicle has a relatively low-specification CPU and low-capacity memory, and we have discovered that it is difficult to apply the general difference update technology due to a characteristic of a flash memory that stores software or information.

SUMMARY

The present disclosure has been made in an effort to provide a method of updating a control unit for a vehicle, which is capable of effectively updating software or information of a control unit for a vehicle by a difference update method.

An exemplary form of the present disclosure provides a method of updating a control unit for a vehicle, the method including: generating raw difference data by comparing an old version of data with a new version of data; generating divided difference data by dividing the raw difference data for each memory sector; and updating the old version to the new version by using the divided difference data.

The raw difference data may include same, added, changed, and deleted data.

The same data and the deleted data may include size information, and the added data and the changed data include size information and data information.

The generating of the divided difference data may include: sequentially loading the raw difference data in an order of the sector; calculating an old version address and a new version address of the loaded data; and moving the loaded data to a memory sector corresponding to the new version address.

The generating of the divided difference data may include, when the loaded data is the same data, the added data, or the changed data and overlaps in two or more memory sectors, additionally dividing overlapping data.

The generating of the divided difference data may include in consideration of data moved to the memory sector, setting an order of difference release for each sector to a reverse order of the movement of the data.

The generating of the divided difference data may include setting a sector address of the old version of the data moved to the memory sector is set as a reference location of the old version.

The generating of the divided difference data may include including the order of the difference release and the reference location of the old version to the divided difference data.

The memory sector may be applied to a memory device different from a memory device of the old version and the raw difference data.

The memory sector may be a difference release buffer, and may be formed of a flash memory or a Static Random Access Memory (SRAM).

The updating of the old version to the new version may include: obtaining an address value of the old version by referring to a reference location of the old version in order to perform difference release on the divided difference data; obtaining a start address of a difference release buffer in which the divided difference data is stored as an address value of the new version; and performing difference release on the divided difference data according to the data type of the divided difference data, the address value of the old version, and the address value of the new version.

The performing of the difference release may include performing the difference release on the divided difference data in consideration of a predetermined order of difference release.

The updating of the old version to the new version may include, when the data type of the divided difference data is the same data, increasing the address value of the old version and the address value of the new version by a size of the same data.

The updating of the old version to the new version may include, when the data type of the divided difference data is the added data, increasing the address value of the new version by a size of the added data.

The updating of the old version to the new version may include, when the data type of the divided difference data is the changed data, increasing the address value of the old version and the address value of the new version by a size of the changed data.

The updating of the old version to the new version may include, when the data type of the divided difference data is the deleted data, increasing the address value of the old version by a size of the deleted data.

The old version and the raw difference data may be stored in the same flash memory.

According to the method of updating the control unit for the vehicle according to the exemplary form of the present disclosure, it is possible to effectively and rapidly perform difference update on a control unit for a vehicle having a low-specification processing unit and a low-capacity memory.

The foregoing summary is illustrative only and is not intended to be in any way limiting. In addition to the illustrative aspects, forms, and features described above, further aspects, forms, and features will become apparent by reference to the drawings and the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A, 4B and 4C are diagrams illustrating an example of the generation of difference data in the method of updating the control unit for the vehicle according to the exemplary form of the present disclosure;

Figure 17A:
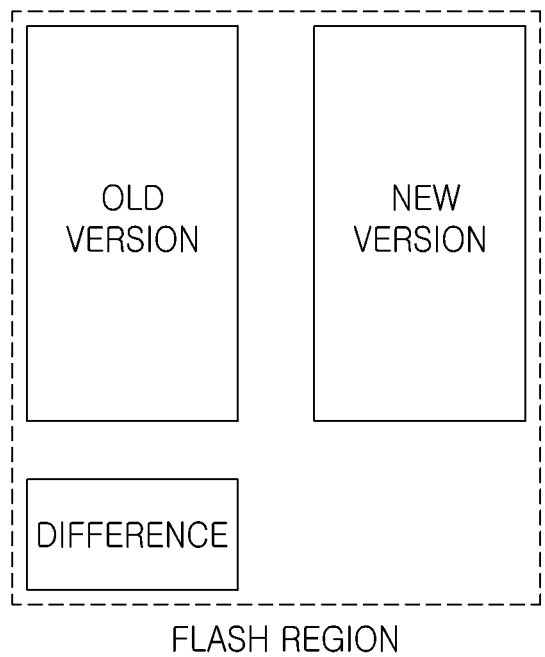
Figure 17B:
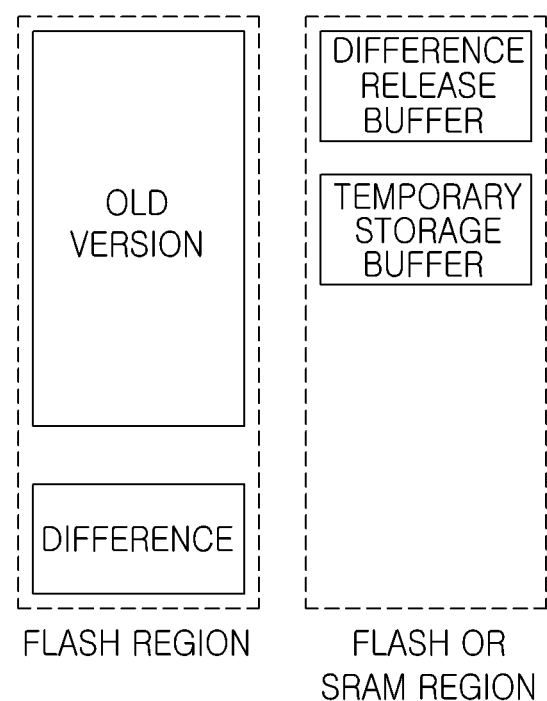
Figure 18:
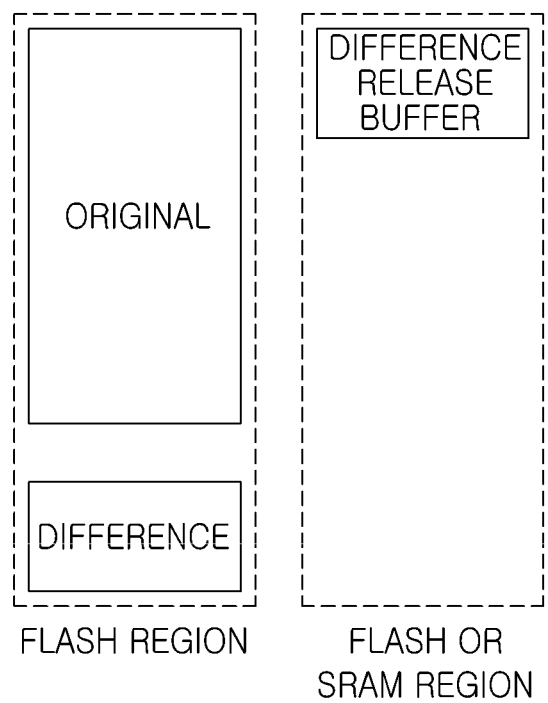
Figure 19:
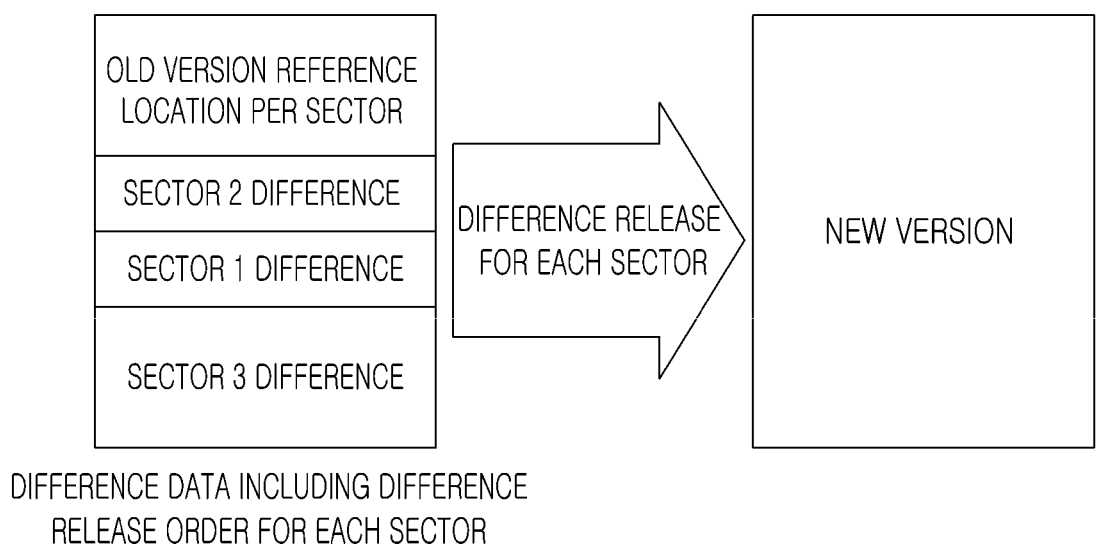
Figure 20:
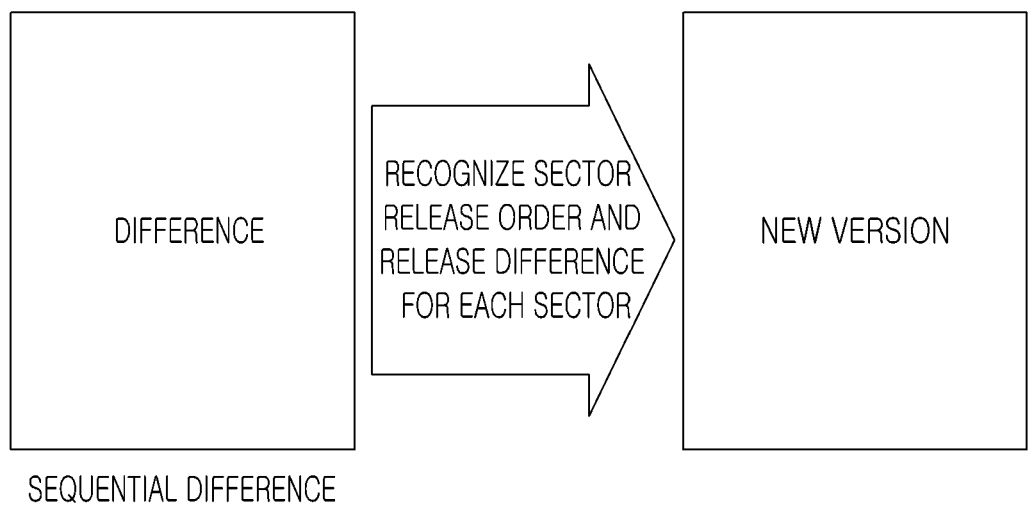

FIGS. 17A and 17B respectively show a first diagram illustrating data stored for each memory region in the method of updating the control unit for the vehicle according to the exemplary form of the present disclosure;

FIG. 18 is a second diagram illustrating data stored for each memory region in the method of updating the control unit for the vehicle according to the exemplary form of the present disclosure;

FIG. 19 is a diagram illustrating a first exemplary form in which difference is released by changing the order of difference release for each sector in the method of updating the control unit for the vehicle according to the exemplary form of the present disclosure; and FIG. 20 is a diagram illustrating a second exemplary form in which difference is released by changing the order of difference release for each sector in the method of updating the control unit for the vehicle according to the exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. First of all, it should be noted that in giving reference numerals to elements of each drawing, like reference numerals refer to like elements even though like elements are shown in different drawings. It should be understood that although the exemplary form of the present disclosure are described hereafter, the spirit of the present disclosure is not limited thereto and may be changed and modified in various ways by those skilled in the art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

Figure 1:
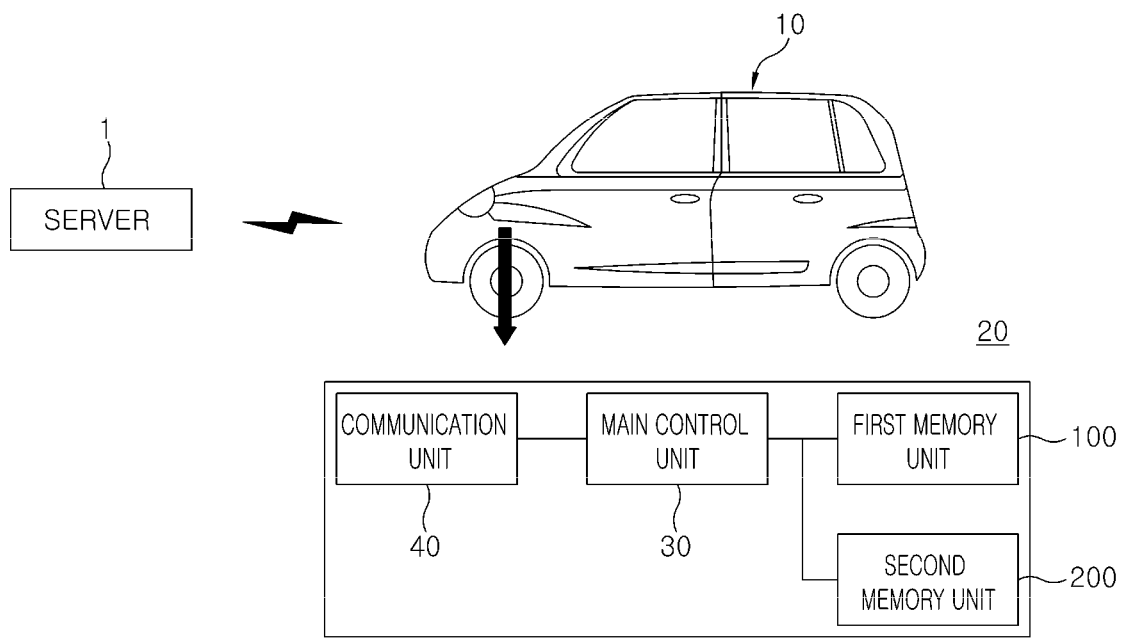
FIG. 1 is a diagram illustrating a configuration of a system for updating a control unit for a vehicle.

FIG. 1 is a diagram illustrating a configuration of a system for updating a control unit for a vehicle.

The configuration of a system for updating a control unit for a vehicle includes a server 1 providing update information, and a vehicle 10 which communicates with the server 1 and updates software or information of a control unit 20 provided therein. The server 1 and the vehicle 10 may be connected by a wired manner, but may be wirelessly connected for an Over The Air (OTA) update.

The vehicle 10 includes at least one control unit 20, and the control unit 20 may perform a function of electrically controlling a specific part of the vehicle or providing a driver with specific information.

The control unit 20 may include a main control unit 30 for controlling the function of the control unit 20, a communication unit 40 performing communication with the outside of the control unit 20, and a first memory 100 storing software or information for performing the function of the control unit 20. Further, the control unit 20 may further include a second memory 200 in addition to the first memory 100. In the exemplary form, the first memory 100 may be a flash memory that is a kind of inactive memory medium, and the second memory 200 may be a Random Access Memory (RAM). Further, the second memory 200 may be a Static RAM (SRAM). However, in the exemplary form of the present disclosure, the first memory 100 and the second memory 200 are not limited to the foregoing as a matter of course.

When the software or information stored in the first memory 100 is to be updated, data from the server 1 is transmitted to the main control unit 30 through the communication unit 40, and the main control unit 30 updates the software or information stored in the first memory 100 by using the corresponding data. In this case, when the main control unit 30 updates the software or information of the first memory 100, the main control unit 30 may temporarily store partial data in the second memory 200 and utilize the data.

In the meantime, in the present disclosure, the update of the control unit 20 for the vehicle may be performed by a difference update method. In the present disclosure, the difference update refers to an update of software or information by using a different portion, that is, a difference, between file information prestored in the control unit 20 and file information to be updated. A method of updating a control unit for a vehicle according to the present disclosure generates difference data by comparing an old version of software or information stored in the control unit 20 with a new version of software or information to be updated and performs an update by using the difference data.

The method of updating the control unit for the vehicle according to the exemplary form of the present disclosure may update a new version of software or information in a sector of the first memory 100 in which the software or information is stored without using a large-capacity memory.

Generate Difference Data

A flash memory having a sector structure has the characteristic that writing is possible only after erasing a sector at a recording desired location for recording in the flash memory, unlike a RAM that is free to read and write. The method of erasing the sector of the flash memory includes a chip erase method in which total sectors are erased at once and a sector erase method in which each sector is erased. When the control unit 20 includes a storage medium which has excellent computation performance and is capable of storing all of a new version of the program or information to be updated, the control unit 20 may delete all of the old version of the program or information (hereinafter, simply referred to as an "old version") and update a new version of the program or information (hereinafter, simply referred to as a "new version"). However, as described above, in the case of the control unit 20 for the vehicle, it is not desirable to sufficiently secure computation performance or memory from the viewpoint of cost and design. With respect to the problem, the present disclosure may effectively update the control unit for the vehicle by generating difference data by comparing an old version and a new version and updating the control unit 20 by using the difference data.

In the meantime, in the description below, updating an individual sector in which an old version is stored to a new version by using difference data will be referred to as "difference release". According to the kind of difference data and a size of difference data, an additional sector may be desired or some sectors are simply erased for securing a storage space, so that it is desired to consider an order of difference release.

Figure 2:
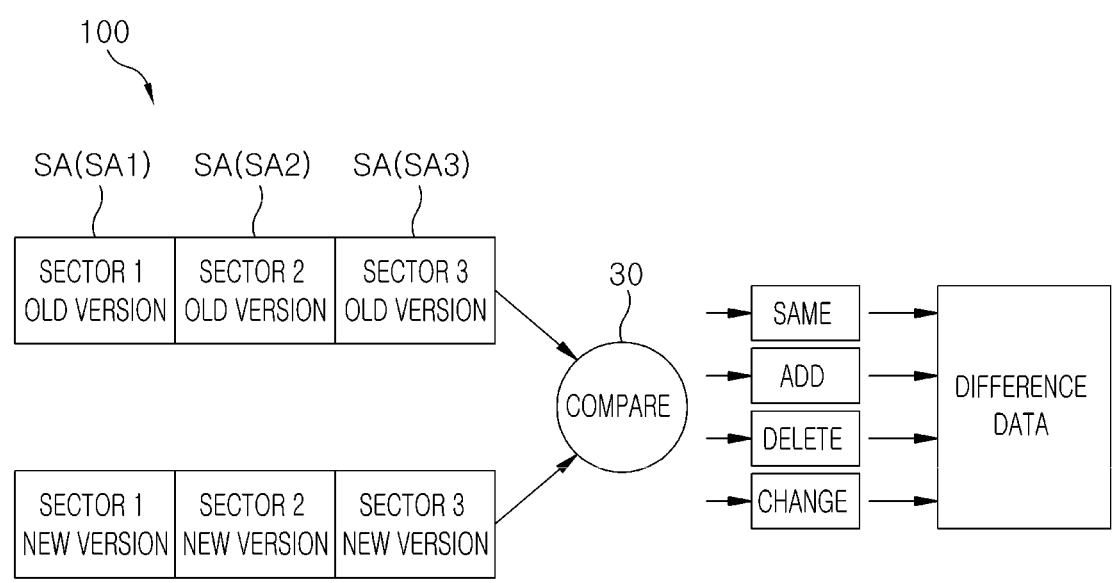
FIG. 2 is a diagram illustrating a process of generating difference data in a method of updating a control unit for a vehicle according to an exemplary form of the present disclosure.
Figure 3A:
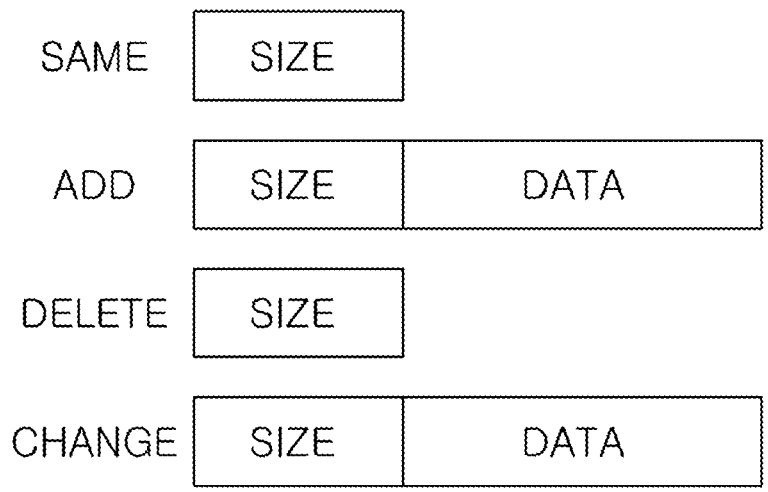
FIGS. 3A and 3B are diagrams illustrating difference data generated in the method of updating the control unit for the vehicle according to the exemplary form of the present disclosure.
Figure 3B:
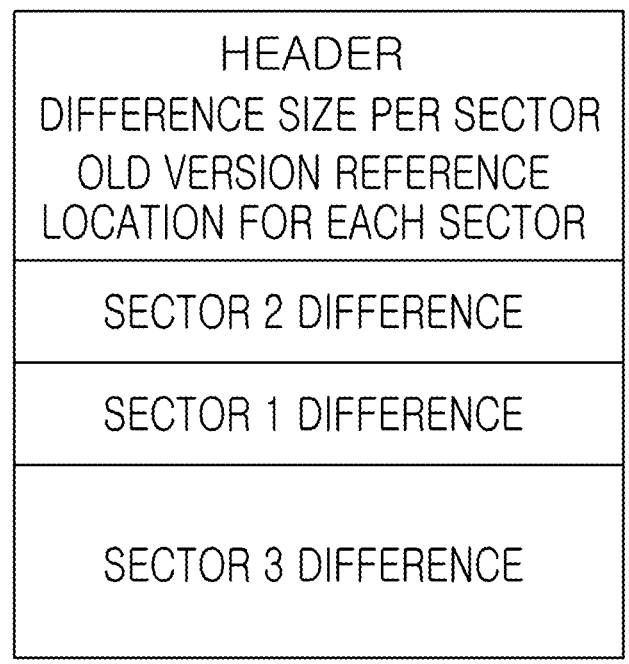

FIG. 2 is a diagram illustrating a process of generating difference data in the method of updating the control unit for the vehicle according to the exemplary form of the present disclosure, and FIGS. 3A-3B are diagrams illustrating difference data generated in the method of updating the control unit for the vehicle according to the exemplary form of the present disclosure.

The difference data is generated by comparing the old version of software or information (old version) stored in a sector SA of the first memory 100 of the control unit 20 with the new version of software or information (new version). Referring to FIG. 2, the first memory 100 is provided with the plurality of sectors SA including a first sector SA1, a second sector SA2, and a third sector SA3.

The difference data is generated by comparing the old version with the new version for each sector, and in the difference data, the same data, the added data, the deleted data, and the changed data may be sequentially formed. The comparison between the old version and the new version may be performed by the main control unit 30 of the control unit 20.

"Same" means to maintain the old version of data because the old version is the same as the new version. In the case of "same", the old version is not changed, so that only size information of the old version data is included in the difference data.

"Addition" means that the new version includes data added together with the old version information. In the case of "addition" new data that does not exist in the old version is included, so that both a size and data are included in the difference data.

"Deletion" means that the new version does not have the old version of data, so the old version of data needs to be deleted. In the case of "deletion", the old version is deleted, so that only a size is included in the difference data.

"Change" means that the old version of data needs to be changed to the new version of data. In the case of "change", the old version needs to be changed to the new version, so that both a size and data are included in the difference data.

However, in the exemplary form of the present disclosure, "addition" and "change" are not separately discriminated, and may be combined to "change" and managed.

Referring to FIG. 3B, a structure of the generated difference data is illustrated. A header of the difference data includes a size of the difference data for each sector and a reference location (address) of the old version for each sector. Data according to a difference for each sector is included in a data block of the difference data. The difference data may be aligned in an order of difference release which is to be described below.

Figure 4A:
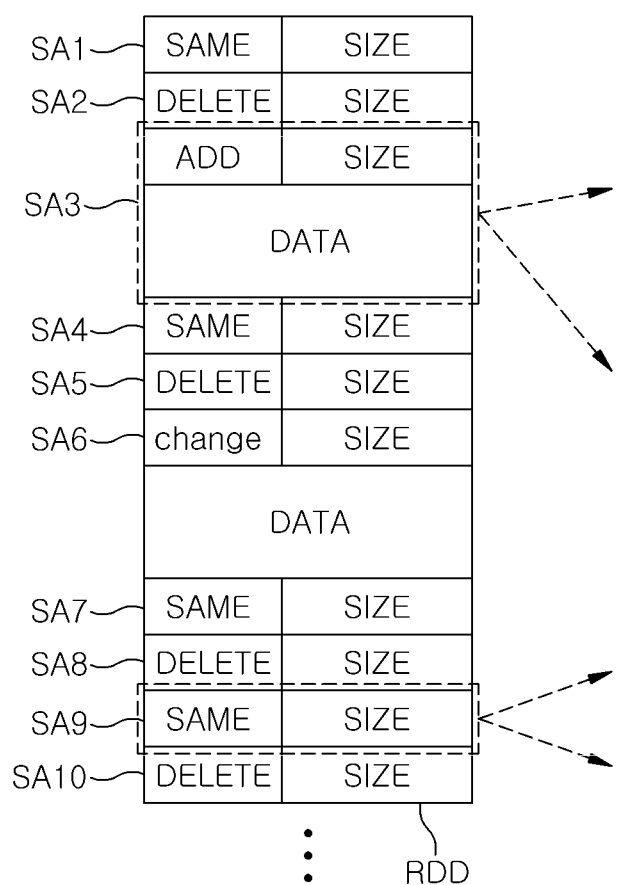
Figure 4B:
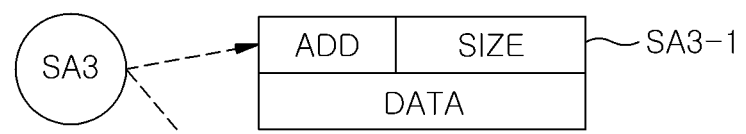

FIGS. 4A-4C are diagrams illustrating an example of the generation of difference data in the method of updating the control unit for the vehicle according to the exemplary form of the present disclosure.

FIG. 4A illustrates an example of Raw Difference Data (RDD) generating difference data in an order of the sector SA of the first memory 100. In the RDD, attributes and data obtained by comparing the old version and the new version in the order of sectors SA are organized. FIG. 4C illustrates an example of Divided Difference Data (DDD) divided so as to be stored in the sector of the first memory 100 after the update by using the RDD. In FIG. 4A and FIG. 4C, the first sector SA1 is physically the same before and after the update, but for convenience of the description, the first sector of the old version before the update is indicated with "SA1" and the first sector of the new version after the update is indicated with "SA1_U".

The first sector SA1 is "same" and the second sector SA2 is "deletion", so that each of the first sector SA1 and the second sector SA2 has only data for attribute information and a size. The third sector SA3 corresponds to "addition", so that the third sector SA3 includes all data including a size, previous data, and the added data. In this order, the difference data of the first to tenth sectors SA1 to SA10 of the RDD are illustrated.

In updating the old version to the new version, in order to efficiently use the first memory 100, it is desirable to record the data in the sector of the first memory 100 by reflecting deleted, added or changed data.

Figure 4B:
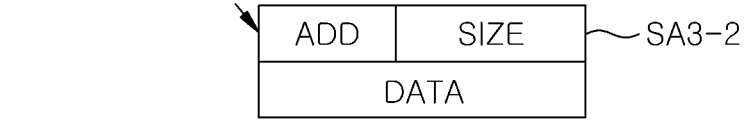

A process of processing the RDD will be described with reference to the example of FIG. 4. The data of the previous first sector SA1 is stored as it is in the first sector SA1_U of the first memory 100 after the update. Since the data of the second sector SA2 is deleted, the data according to the previous third sector SA3 may be input to the second sector SA2_U after the update, but the case where all of the updated data of the third sector SA3 is not stored in the second sector SA2_U by the added data is considered. In this case, the data of the third sector SA3 is divided in consideration of a new sector address for the new version to be generated as 3-1 sector data SA3-1 and 3-2 sector data SA3-2 as illustrated in FIG. 4B. As illustrated in FIG. 4C, after the update, the 3-1 sector data SA3-1 is allocated to the second sector SA2_U and the 3-2 sector data SA3-2 and data of the fourth sector SA4 are allocated to the third sector SA3_U.

That is, in the present disclosure, the RDD may be divided based on a data sector location at which the data is to be located when the difference is released. Herein, in the case where the data corresponding to the same, changed, and added information overlap in two or more sectors, the overlapping data may be additionally divided based on the sector.

Figure 5:
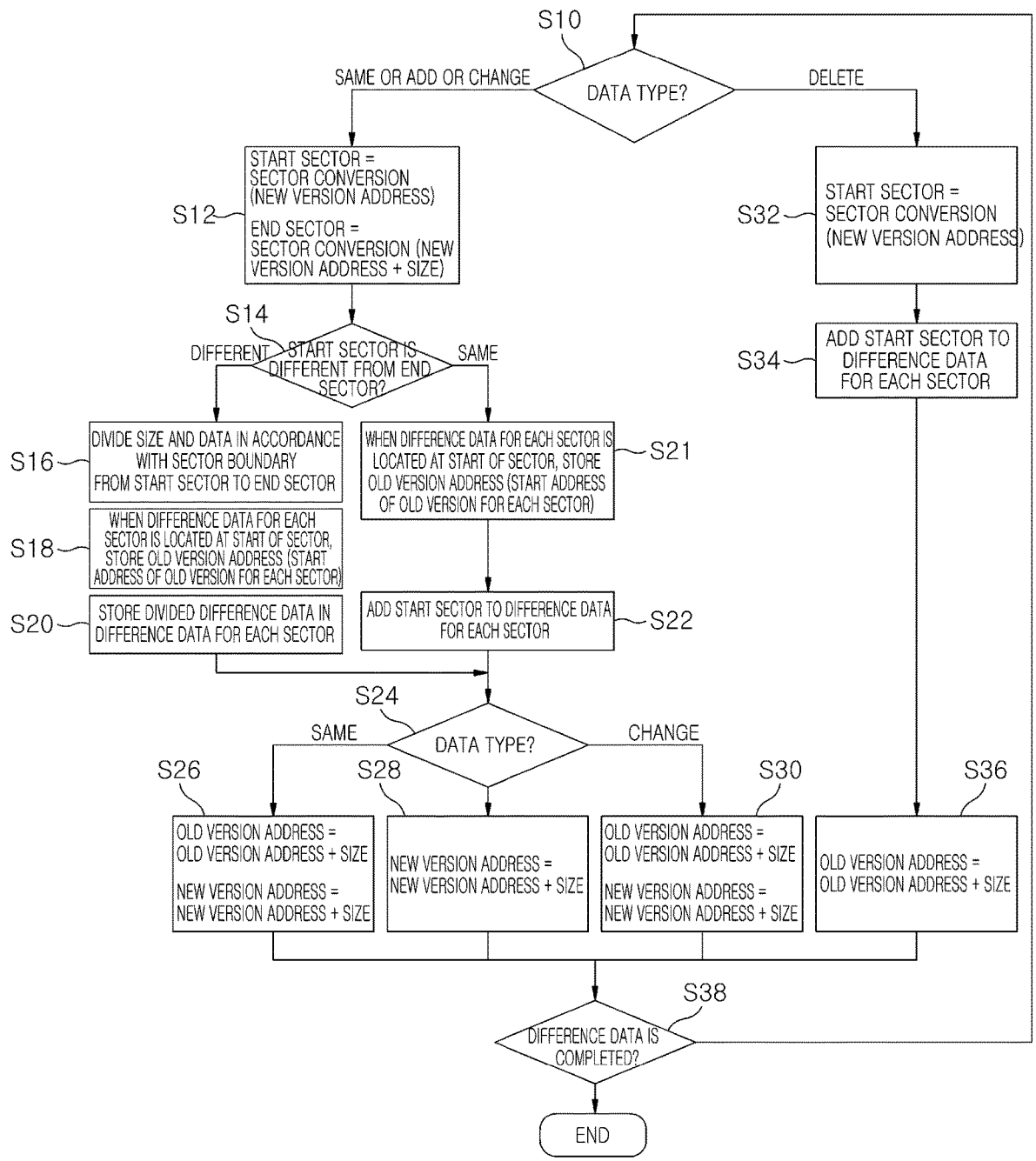
FIG. 5 is a flowchart illustrating a process of generating difference data in the method of updating the control unit for the vehicle according to the exemplary form of the present disclosure.

FIG. 5 is a flowchart illustrating a process of generating difference data in the method of updating the control unit for the vehicle according to the exemplary form of the present disclosure.

The method of generating the sector DDD based on the new version includes detecting start sector addresses of the old version and the new version by sequentially loading the RDD, calculating a sector location in accordance with the start sector address of the new version, and inputting the RDD to the corresponding sector.

In this case, since the RDD corresponding to the same, addition, and change changes an address value of the new version, the data may overlap in the different sectors, and in this case, the overlapping data may be separated in accordance with a size of the corresponding sector and stored in each sector.

The calculation of the address value of the old version is for the purpose of storing an address of the old version when the sector is transitioned. The address value of the old version is derived to be used as a reference location of the old version when the difference is released for each sector.

In describing the process of generating the DDD in detail with reference to FIG. 5, first, the data type of RDD is determined in the order of sectors of the first memory 100 (S10). Herein, in the case where the type of RDD is the same, the addition, or the change, operation S12 may be performed, and in the case where the type of RDD is the deletion, operation S32 may be performed.

In the case where the data type of RDD is the "same", the "addition", or the "change", a sector of a new version is converted to a start sector based on a sector address of the new version, and is converted to an end sector according to a sector address of the new version and a size (S12).

It is determined whether there is a difference by comparing the start sector with the end sector (S14). Herein, when the start sector is different from the end sector, operation S16 may be performed, and when the start sector is the same as the end sector, operation S21 may be performed.

When the start sector is different from the end sector, a size and the data are divided in accordance with a sector boundary from the start sector to the end sector (S16).

When the DDD for each sector is located at the start of the sector, an address of the old version is stored (S18). Herein, the address of the old version corresponds to a start address of the old version for each sector.

The divided RDD is stored as the DDD for each sector (S20).

When the start sector is the same as the end sector, the address of the old version when the DDD for each sector is located at the start of the sector (the start address of the old version for each sector) is stored (S21).

The start sector is added to the DDD for each sector (S22).

After operation S20 and operation S22, the data type of the RDD is determined (S24).

When the data type of the RDD is the "same", the address of the old version and the size information are included in a reference address of the old version of the DDD, and the data type of "same" and the size information are included in the address of the new version of the DDD (S26).

When the data type of the RDD is the "addition", the data type of "addition", the size information, and data contents are included in the address of the new version of the DDD (S28).

When the data type of the RDD is the "change", the address of the old version and the size information are included in the reference address of the old version of the DDD, and the data type of "change", the size information, and data contents are included in the address of the new version of the DDD (S30).

In the meantime, going back to operation S10, when the data type of the RDD is the "deletion", the sector of the address of the new version is converted to a start sector (S32).

The converted start sector is added to the DDD (S34).

The address of the old version is included in the reference address of the old version of the DDD, and the data type of "deletion" and the size information are included in the start sector of the DDD (S36).

After operations S26, S28, S30, and S36, it is determined whether the division for each sector of the RDD is completed (S38). When the division for each sector of the RDD is not completed, the operations after operation S10 may be continuously performed.

Figure 6:
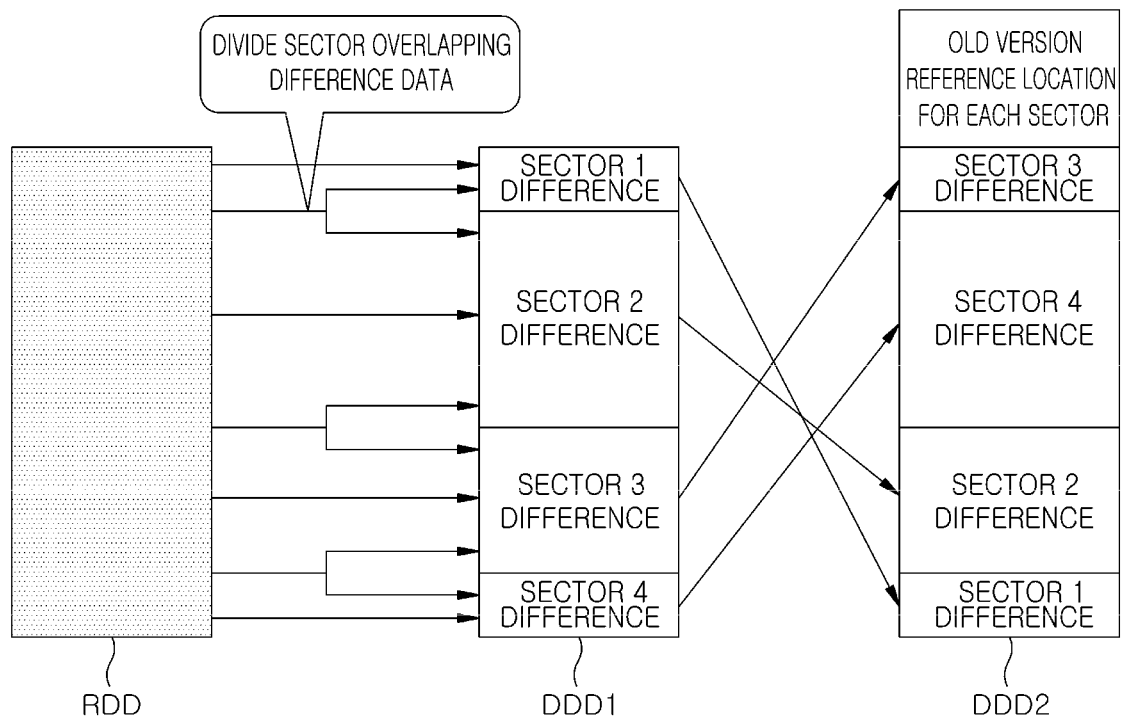
FIG. 6 is a diagram illustrating divided difference data divided for each sector in the method of updating the control unit for the vehicle according to the exemplary form of the present disclosure.

FIG. 6 is a diagram illustrating divided difference data divided for each sector in the method of updating the control unit for the vehicle according to the exemplary form of the present disclosure.

Referring to FIG. 6, the RDD may be divided into a first sector (sector 1 difference), a second sector (sector 2 difference), a third sector (sector 3 difference), and a fourth sector (sector 4 difference). In this case, when difference data overlapping a sector occurs, the overlapping difference data may be additionally divided.

Accordingly, new version-based DDD DDD1 may be generated. The new version-based DDD DDD1 may be obtained by dividing the difference data based on a data sector location at which the data is to be located when the difference is released.

The new version-based DDD DDD1 may be converted to DDD DDD2 including the reference location of the old version for each sector and a difference release order. The DDD DDD2 including the difference release order includes the reference location of the old version for each sector, so that data of another sector may be saved, and the difference may be released without a separate large-capacity temporary storage memory.

Difference Release (Update for Each Sector) Order

Figure 7:
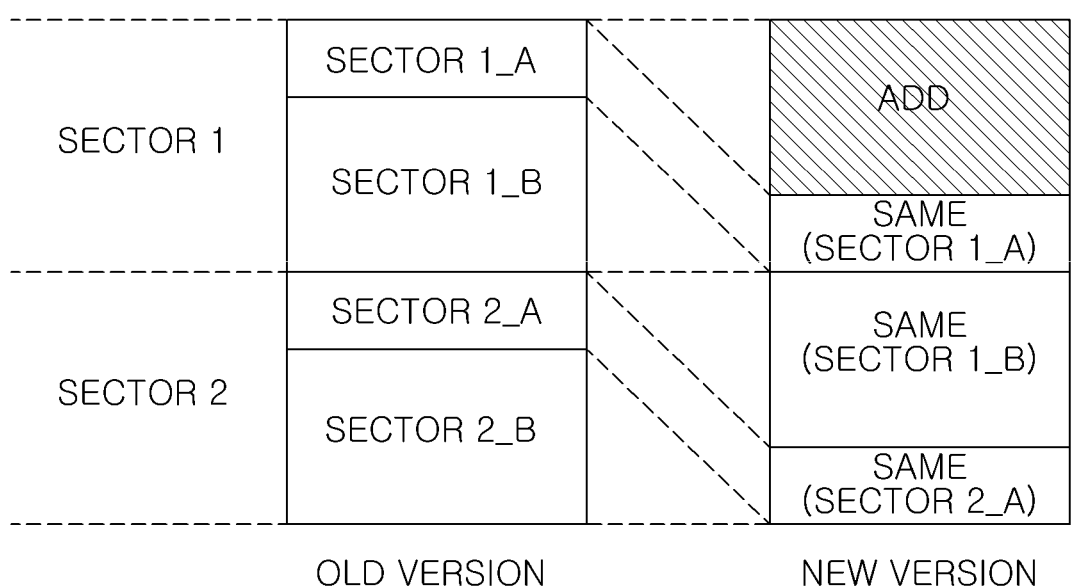
FIG. 7 is a diagram illustrating data movement expected according to data addition in the method of updating the control unit for the vehicle according to the exemplary form of the present disclosure.

FIG. 7 is a diagram illustrating data movement expected according to data addition in the method of updating the control unit for the vehicle according to the exemplary form of the present disclosure.

Referring to FIG. 7, in the first sector of the old version, the same data information as that of the new version is stored in A address region sector 1_A and B address region sector 1_B, and in the second sector of the old version, the same data information as that of the new version is stored in A address region sector 2_A and B address region sector 2_B. In this case, additional data information and the same data information as that of the A address region sector 1_A of the first sector of the old version are stored in the first sector of the new version. Further, the same data information as that of the B address region of the first sector (sector 1_B) and the A address region of the second sector (sector 2_A) of the old version are stored in the second sector of the new version.

Hereinafter, a data movement expected when the data of the new version including the additional data moves to the sector in which the old version is stored will be described with reference to FIGS. 8 and 9.

Figure 8:
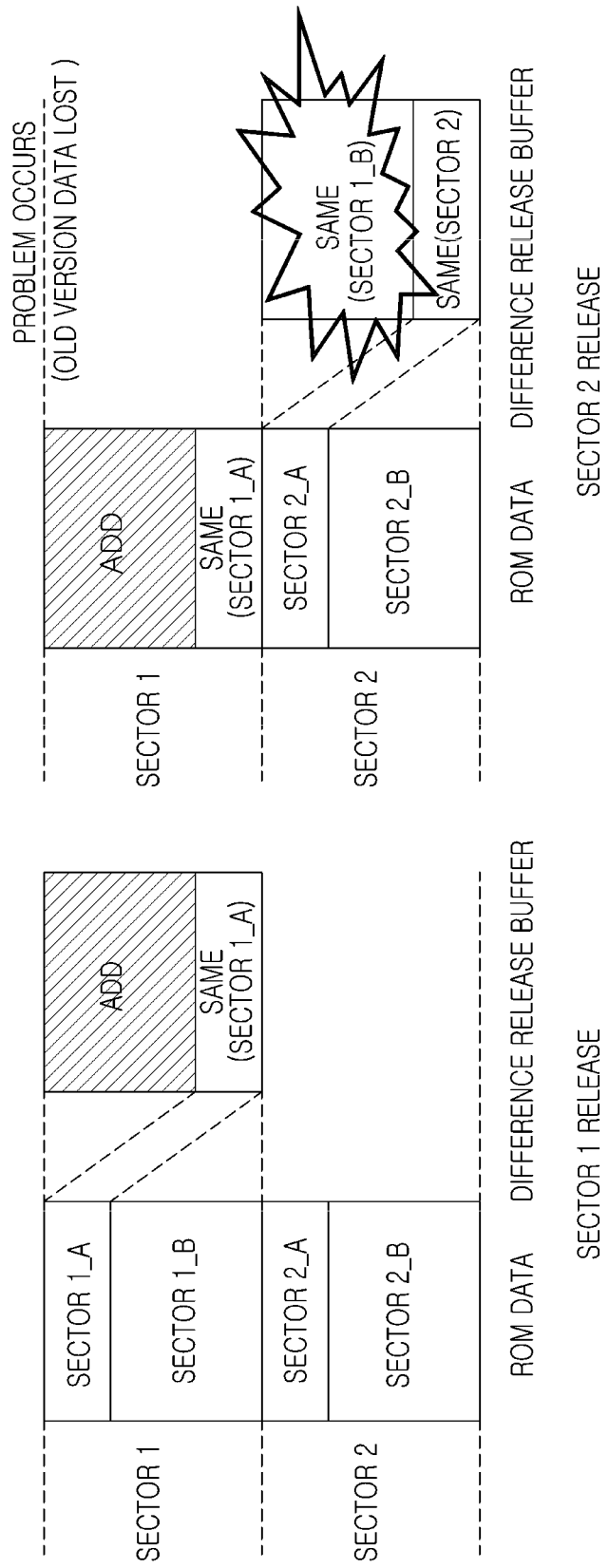
FIG. 8 is a diagram illustrating a problem situation that occurs in the case where an order of difference release for each sector is forward when data is added in the method of updating the control unit for the vehicle according to the exemplary form of the present disclosure.

FIG. 8 is a diagram illustrating a problem situation that occurs in the case where an order of difference release for each sector is forward when data is added in the method of updating the control unit for the vehicle according to the exemplary form of the present disclosure.

Referring to FIG. 8, in the case where the total size of ROM data is the same as the size of the difference release buffer or there is no room for a size of a storage space when the difference is released, processing needs to be performed by securing only a storage space corresponding to one sector, and in this case, when the difference is released in a forward direction from the first sector to the second sector, there is a problem in that the same data information sector 1_B in the A address region is lost in the second sector of the new version.

Figure 9:
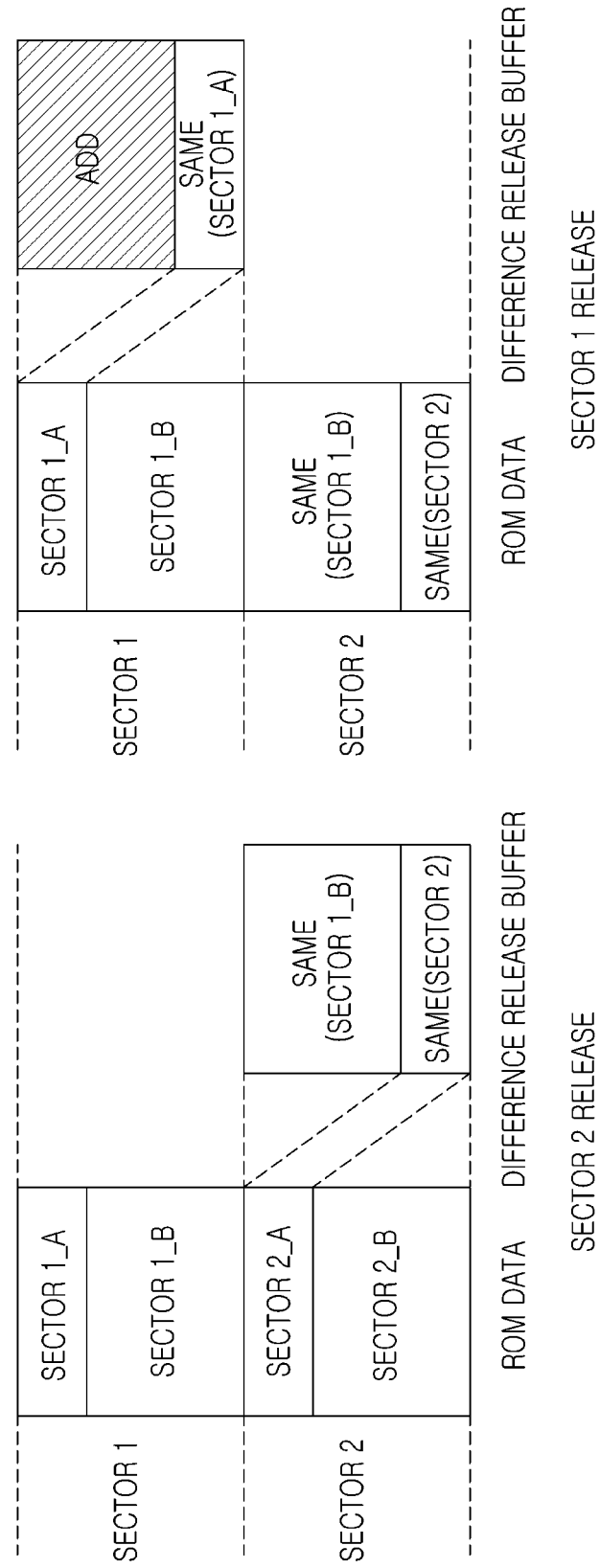
FIG. 9 is a diagram illustrating the case where it is possible to solve the problem situation of FIG. 9 when the order of difference release for each sector is reverse when data is added in the method of updating the control unit for the vehicle according to the exemplary form of the present disclosure.

FIG. 9 is a diagram illustrating the case where it is possible to solve the problem situation of FIG. 9 when the order of difference release for each sector is reverse when data is added in the method of updating the control unit for the vehicle according to the exemplary form of the present disclosure.

Referring to FIG. 9, in the case where the total size of ROM data is the same as the size of the difference release buffer or there is no room for a size of a storage space when the difference is released, when the difference is released in a reverse direction from the second sector to the first sector, all of the same data information sector 1_B in the A address region are present in the second sector of the new version without a loss problem when the difference of the second sector is released.

Figure 10:
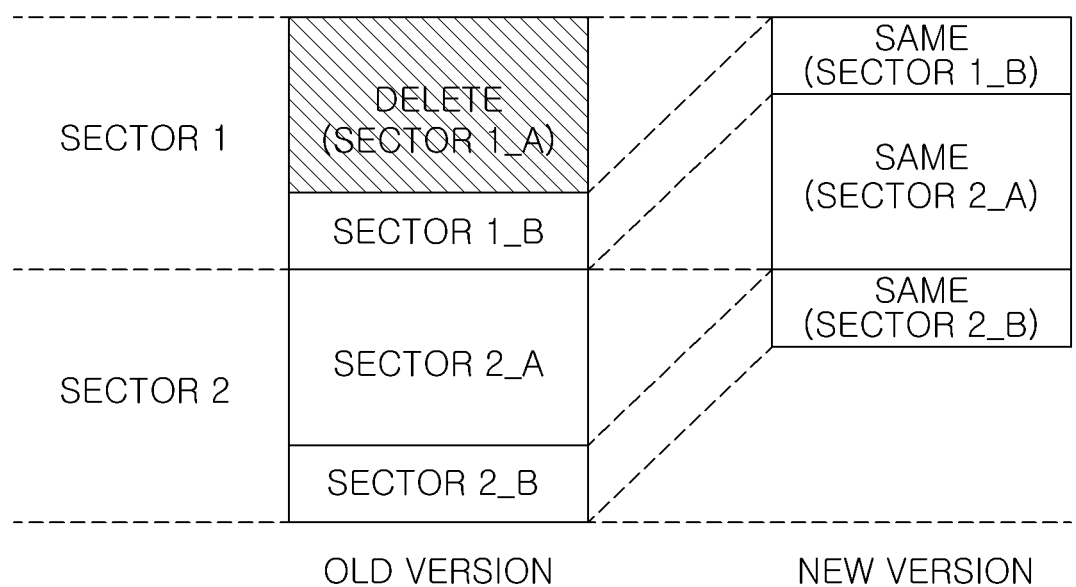
FIG. 10 is a diagram illustrating data movement expected according to data deletion in the method of updating the control unit for the vehicle according to the exemplary form of the present disclosure.

FIG. 10 is a diagram illustrating data movement expected according to data deletion in the method of updating the control unit for the vehicle according to the exemplary form of the present disclosure.

Referring to FIG. 10, in the first sector of the old version, the data of the A address region sector 1_A is deleted in the new version, and the same data information as that of the new version is stored in the B address region sector 1_B. In the second sector of the old version, the same data information as that of the new version is stored in the A address region sector 2_A and the B address region sector 2_B. In this case, the same data information as that of the B address region of the first sector (sector 1_B) of the old version and the same data information as that of the A address region of the second sector (sector 2_A) of the old version are stored in the first sector of the new version. Further, the same data information as that of the B address region sector 2_B of the second sector of the old version is stored in the second sector of the new version.

As described above, the data may be moved back for the reasons, such as the data addition, but may also be moved forward for the reasons, such as the data deletion.

Hereinafter, a data movement expected when the new version of data is moved to the sector in which the old version is stored according to the data deletion will be described with reference to FIGS. 11 and 12.

Figure 11:
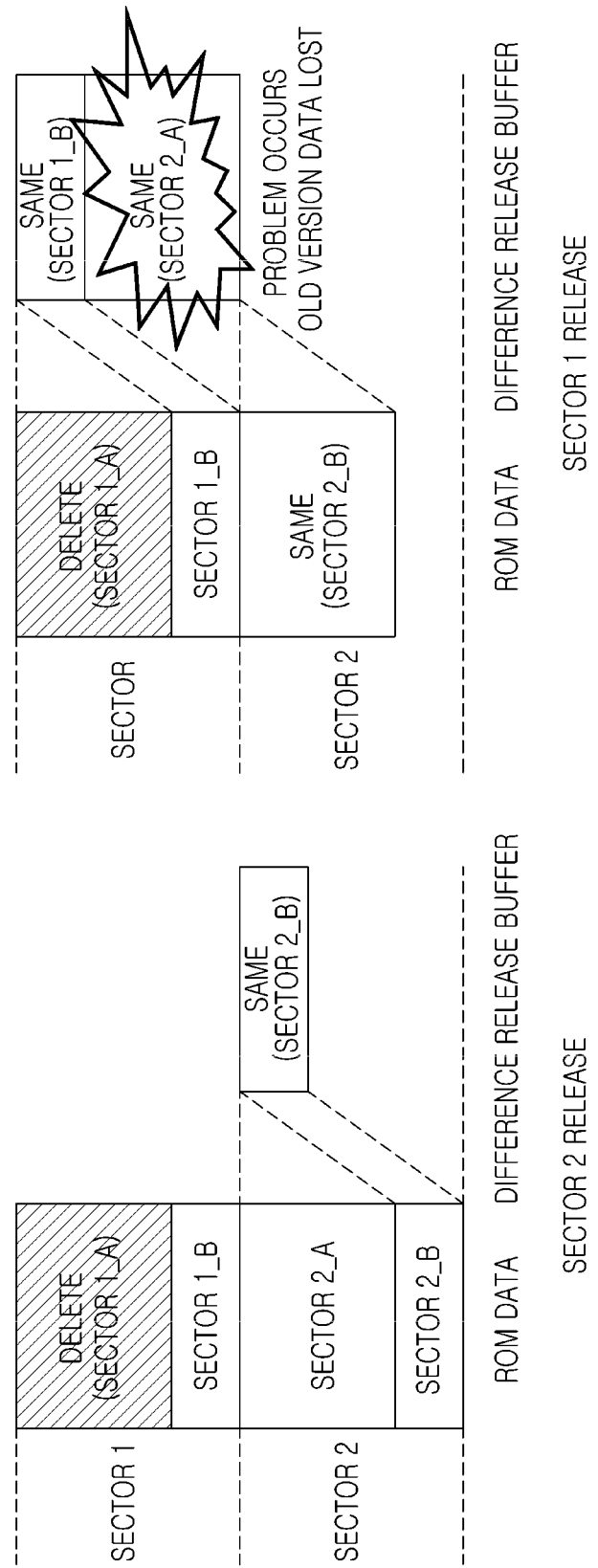
FIG. 11 is a diagram illustrating a problem situation that occurs when the order of difference release for each sector is reverse when data is deleted in the method of updating the control unit for the vehicle according to the exemplary form of the present disclosure.

FIG. 11 is a diagram illustrating a problem situation that occurs when the order of difference release for each sector is reverse when data is deleted in the method of updating the control unit for the vehicle according to the exemplary form of the present disclosure.

Referring to FIG. 11, when the difference is released in a reverse direction from the second sector to the first sector, there occurs a problem in that the same data information sector 2_A in the B address region in the first sector of the new version is lost.

Figure 12:
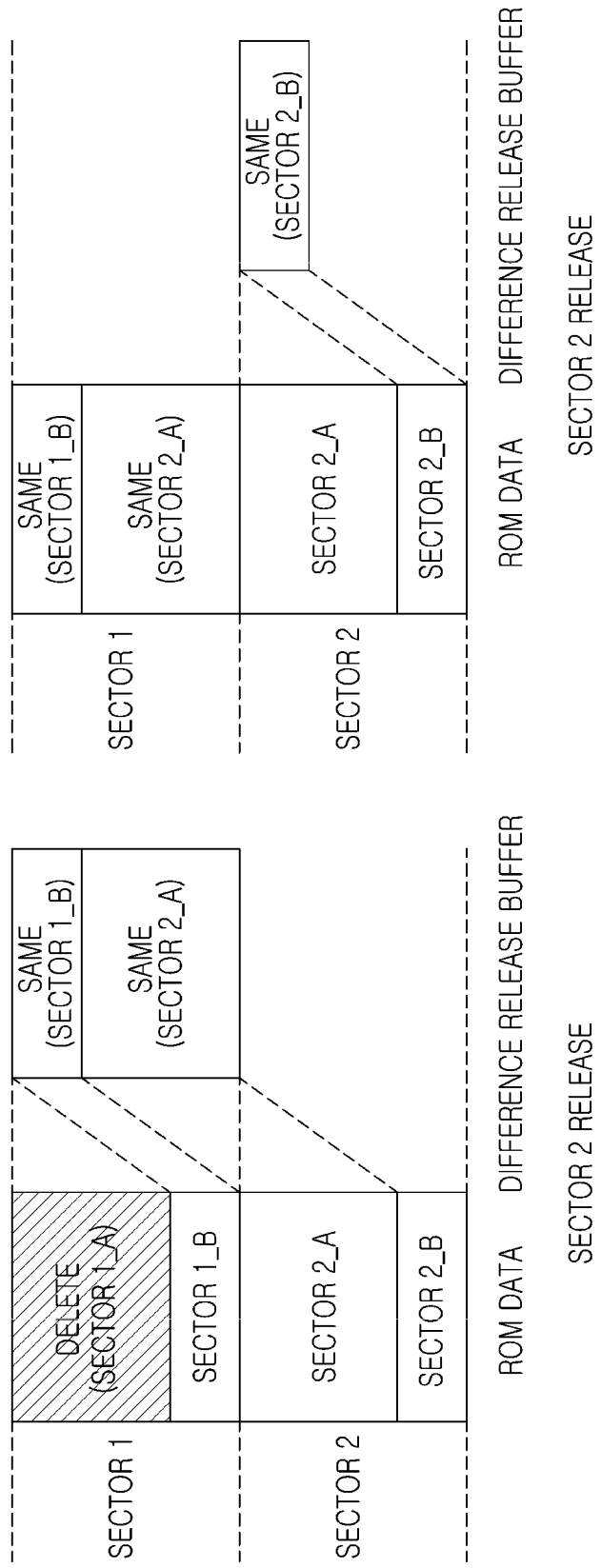
FIG. 12 is a diagram illustrating the case where it is possible to solve the problem situation of FIG. 11 when the order of difference release for each sector is reverse when data is deleted in the method of updating the control unit for the vehicle according to the exemplary form of the present disclosure.

FIG. 12 is a diagram illustrating the case where it is possible to solve the problem situation of FIG. 11 when the order of difference release for each sector is reverse when data is deleted in the method of updating the control unit for the vehicle according to the exemplary form of the present disclosure.

Referring to FIG. 12, when the difference is released in a forward direction from the first sector to the second sector, all of the data information sector 2_A in the B address region in the first sector of the new version exist without lost when the second sector is released.

Figure 13:
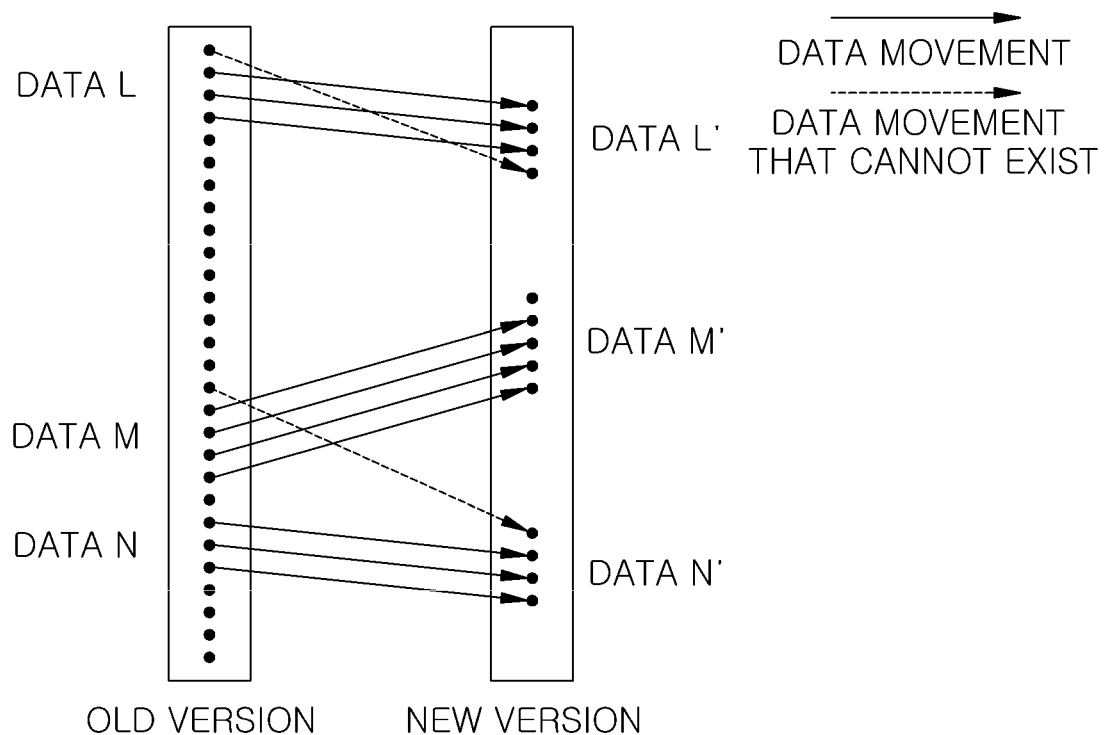
FIG. 13 is a diagram illustrating data movement expected according to data addition and deletion in the method of updating the control unit for the vehicle according to the exemplary form of the present disclosure.

FIG. 13 is a diagram illustrating data movement expected according to data addition and deletion in the method of updating the control unit for the vehicle according to the exemplary form of the present disclosure.

Data L of the old version may be moved to data L' in the new version, but data L of the old version cannot be moved to data M' of the new version or data M of the old version cannot be moved to data N' of the new version. That is, when the data location of the old version is in the order of L, M, and N, the location of the data of the new version that copies the data location of the old version is also in the order of L', M', and N'.

Figure 14:
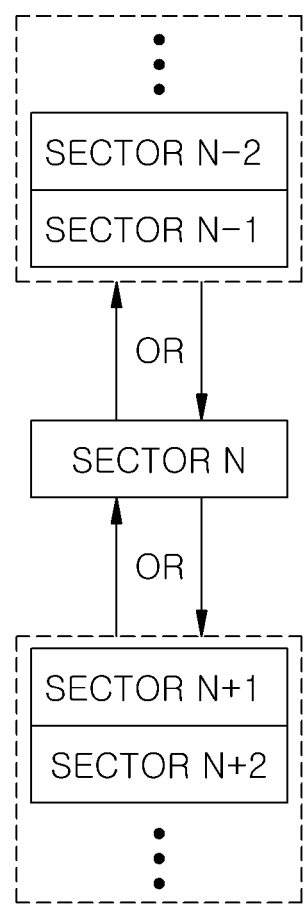
FIG. 14 is a diagram illustrating data movement for each sector in the method of updating the control unit for the vehicle according to the exemplary form of the present disclosure.

FIG. 14 is a diagram illustrating data movement for each sector in the method of updating the control unit for the vehicle according to the exemplary form of the present disclosure.

Referring to FIG. 14, when the data movement of FIG. 13 is applied to the sector unit, it can be seen that the data movement relationship of the $N^{th}$ sector with another sector is a single direction. In the case where N is 4, when the data is moved in the order of sector 5, sector 4, and sector 3, the data movement that reverses the order cannot exist at the same time. For example, the data cannot be moved from sector 4 to sector 5, the data cannot be moved from sector 3 to sector 4, and the data cannot be moved from sector 3 to sector 5.

Figure 15:
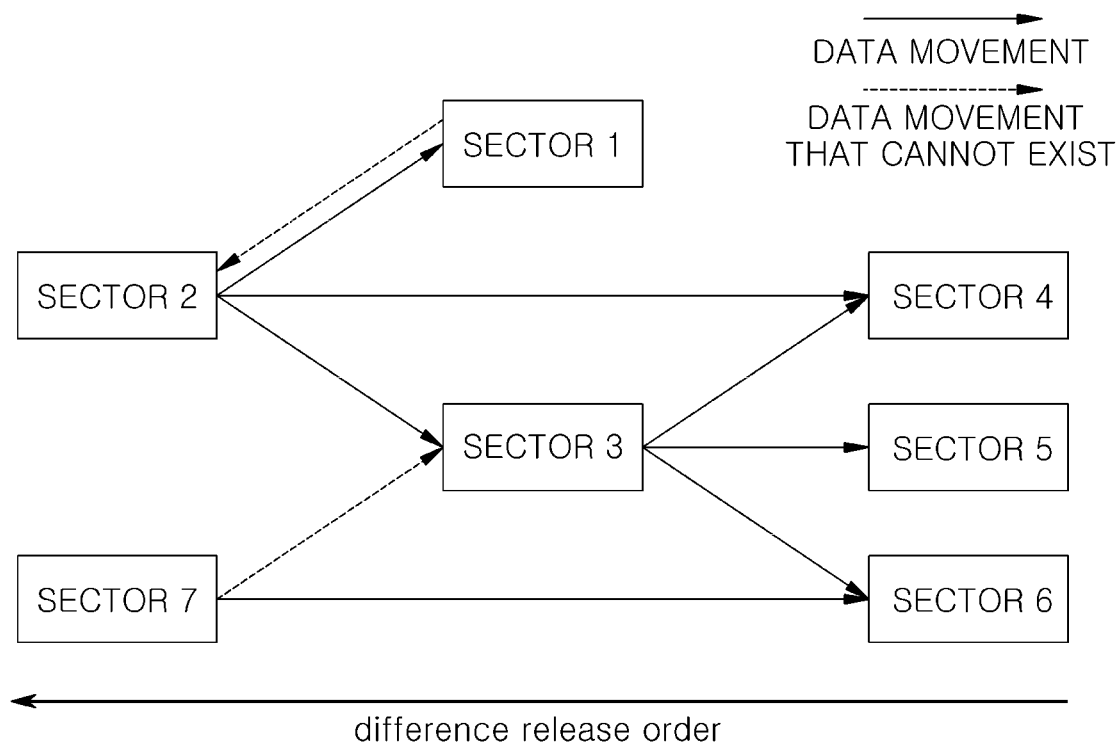
FIG. 15 is a diagram illustrating an order of difference release for each sector in the method of updating the control unit for the vehicle according to the exemplary form of the present disclosure.

FIG. 15 is a diagram illustrating an order of difference release for each sector in the method of updating the control unit for the vehicle according to the exemplary form of the present disclosure.

Referring to FIG. 15, the data may be moved between the sectors by the addition or the deletion of data.

For example, the data of the sector may be moved in a single direction from left to right from sector 2 to sector 1, sector 3, and sector 4, and may be moved in a single direction from left to right from sector 7 to sector 6. Further, the data of the sector may be moved in a single direction from left to right from sector 3 to sector 4, sector 5, and sector 6. However, the data of the sector cannot be moved from sector 1 to sector 2, and cannot be moved from sector 7 to sector 3.

The order of difference release may be set by setting a sector transmitting the difference data to a low priority and setting a sector receiving the difference data to a high priority. In the exemplary form, sector 2 and sector 7 are the sectors transmitting the difference data, and may be set with the lowest priority. Sector 1 and sector 3 are the sectors receiving the difference data, and may be set with the higher priority than those of sector 2 and sector 7. In the meantime, sector 3 is the sector transmitting the difference data, and may be set with a lower priority than that of sector 1. Sector 4, sector 5, and sector 6 are the sectors receiving the difference data, and may be set with the highest priority.

When the difference release is performed reversely to the movement of the data, it is possible to release the difference of all of the sectors without the loss of the data. Herein, the sectors on the same vertical line are irrelevant to the order.

The method of updating the control unit for the vehicle of the present disclosure is characterized in that the difference of the difference data for each sector may be released according to the order of difference release, data of referred another sector may be saved, and the difference of the difference data may be released without a separate large-capacity memory.

Figure 16:
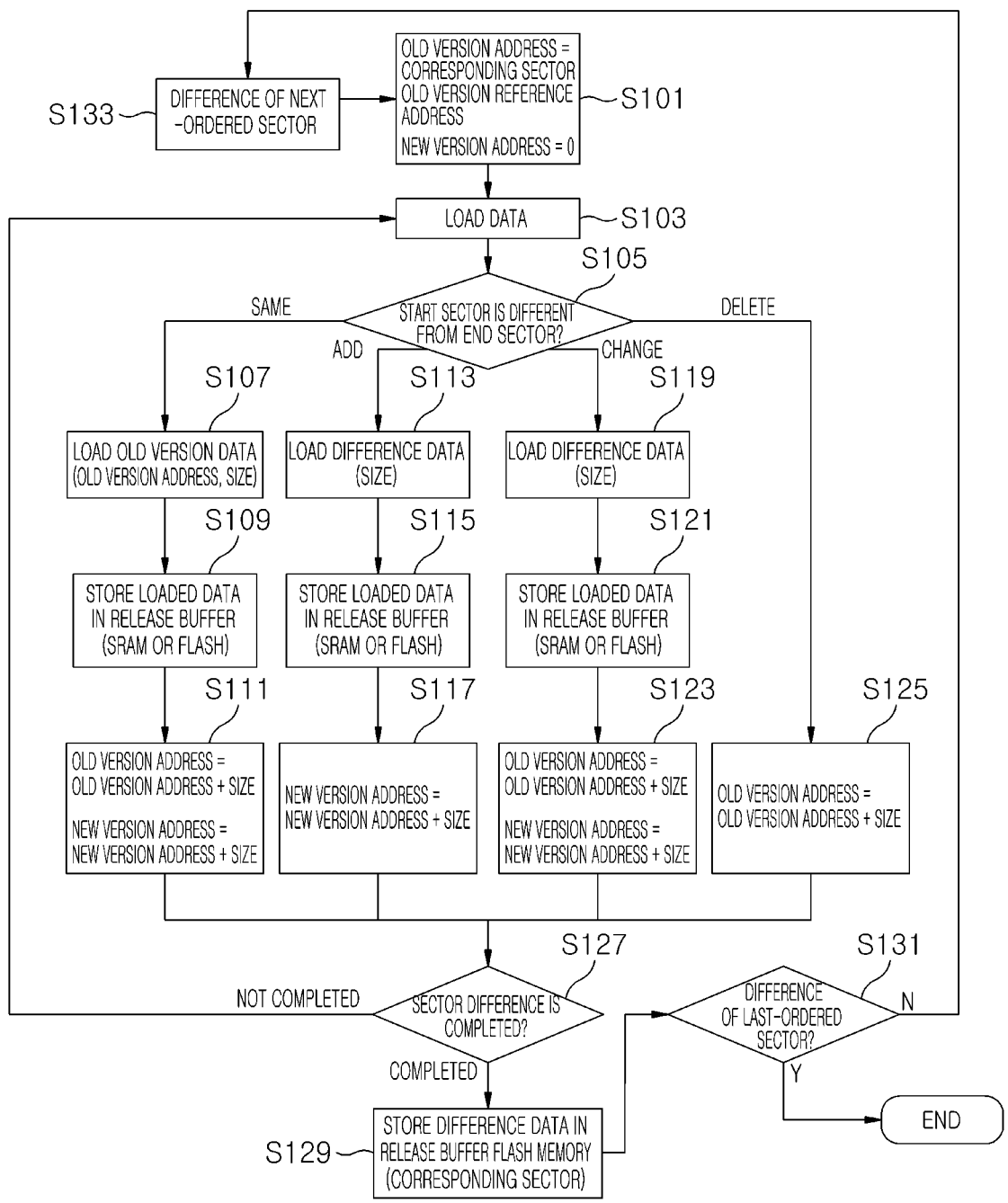
FIG. 16 is a flowchart illustrating a method of releasing difference data for each sector in the method of updating the control unit for the vehicle according to the exemplary form of the present disclosure.

FIG. 16 is a flowchart illustrating a method of releasing difference data for each sector in the method of updating the control unit for the vehicle according to the exemplary form of the present disclosure.

Referring to FIG. 16, for the difference release, the difference data and an old version of data are desired. Further, in the case of the difference data divided for each sector, a reference location of the old version is desired.

A start address value of the old version is set from a reference location of the old version calculated when the difference data is generated. The start address value of a new version is the start address of the differential release buffer, so that the start address value of the new version is initialized to 0 (S101).

The difference data is loaded (S103).

The type of loaded difference data is determined (S105).

When the type of the difference data is the same, the data of the old version is loaded (S107). Herein, the data of the old version includes a sector address and size information of the old version.

The loaded data of the old version is stored in the difference release buffer (S109). Herein, the difference release buffer may be a flash memory or an SRAM.

The sector address of the old version increases by a size in a sector address value of the current old version, and the sector address of the new version increases by a size in a sector address value of the current new version (S111). In this case, the sector address of the old version and the sector address of the new version are stored in the difference release buffer.

When the type of the difference data is addition, the difference data including the size information is loaded (S113).

The loaded difference data is stored in the differential release buffer (S115). Herein, the difference release buffer may be a flash memory or an SRAM.

The sector address of the new version increases by a size in a sector address value of the current new version (S117). In this case, the sector address of the new version is stored in the difference release buffer. The sector address of the old version does not increase.

When the type of the difference data is change, the difference data including the size information is loaded (S119).

The loaded difference data is stored in the differential release buffer (S121). Herein, the difference release buffer may be a flash memory or an SRAM.

The address of the old version increases by a size from an address value of the current old version, and the address of the new version increases by a size from an address value of the current new version (S123). In this case, the address of the old version and the address of the new version are stored in the difference release buffer.

When the type of the difference data is deletion, the address of the old version increases by a size of the deleted data from the address value of the current old version (S125). In this case, the address of the old version is stored in the difference release buffer.

The operations are repeated until the difference release of the difference data for each sector is completed (S127).

When the difference release of the difference data for each sector is completed, the difference data of the corresponding sector is stored in the flash memory (S129).

It is determined whether the difference release of the last sector is completed (S131). When the difference release of all of the sectors is completed, the operation is terminated (S131).

When the difference release is not performed on the last sector, the difference release is performed for the difference data of a next sector according to a pre-interpreted order (S133).

FIGS. 17A-17B respectively illustrate a first diagram illustrating data stored for each memory region in the method of updating the control unit for the vehicle according to the exemplary form of the present disclosure.

Referring to FIGS. 17A-17B, according to the general method of releasing difference data, various data may be divided and stored for each memory region.

In FIG. 17A, for example, the flash memory region of the control unit for the vehicle corresponds to two or more times of the ROM data, and the old version and the difference data may be stored in the flash memory region, and the new version may be stored in a new memory region of the flash memory region.

In FIG. 17B, for another example, a difference release buffer corresponding to a single sector and a temporary storage buffer for a data movement may be provided. The difference release buffer and the temporary storage buffer may be formed of a new flash memory or an SRAM.

In this case, when the difference release buffer and the temporary storage buffer are formed of the flash memory, not the SRAM, it may take too much time for releasing the difference. Further, there is a problem in a capacity when the difference release buffer and the temporary storage buffer are formed of the SRAM.

FIG. 18 is a second diagram illustrating data stored for each memory region in the method of updating the control unit for the vehicle according to the exemplary form of the present disclosure.

Referring to FIG. 18, according to the method of updating the control unit for the vehicle according to the exemplary form of the present disclosure, original data and difference data are stored in the flash memory region, and a difference release buffer may be stored in a separate flash memory or an SRAM region.

This shows that the flash memory region two or more times of the ROM data like FIG. 17A is not required, and the temporary storage buffer like FIG. 17B is not required.

Further, even though the difference release buffer is formed in the flash memory, erasing and writing time for the flash memory region is decreased like of FIG. 17B, and a relatively small-capacity memory is desired, so that it is possible to form the difference release buffer by using the SRAM, and in this case, a difference release speed is highest.

FIG. 19 is a diagram illustrating a first exemplary form in which difference is released by changing the order of difference release for each sector in the method of updating the control unit for the vehicle according to the exemplary form of the present disclosure.

Referring to FIG. 19, the present disclosure is characterized in releasing a difference by changing an order of difference release for each sector according to a data movement. According to the first exemplary form, the order of difference release of the sector may be included in the difference data itself.

FIG. 20 is a diagram illustrating a second exemplary form in which difference is released by changing the order of difference release for each sector in the method of updating the control unit for the vehicle according to the exemplary form of the present disclosure.

Referring to FIG. 20, according to the second exemplary form of the present disclosure, the difference data does not include the order of difference release, but there is a method of performing difference release for each sector by recognizing a corresponding order by the main control unit of the control unit for the vehicle.

The method of updating the control unit for the vehicle according to the exemplary form of the present disclosure is the method of generating difference data in a unit of a sector, aligning the difference data in an order of movement, and then releasing the difference data in the unit of the sector in a reverse order in order to supplement a characteristic of the sector of the flash memory (erase in the unit of the sector, difference release in the order of data writing, and very slow erase and writing) and enable an update of a difference by using a low-capacity memory (SRAM).

The method of updating the control unit for the vehicle according to the exemplary form of the present disclosure has an effect that it is possible to update a difference by using only a low-capacity memory (a single sector size) forming a difference release buffer without using an additional memory according to a movement of difference data.

Although the exemplary form of the present disclosure has been described for illustrative purposes, those skilled in the art will appreciate that various modifications, additions and substitutions are possible, without departing from the scope and spirit of the disclosure. Therefore, the exemplary forms and the accompanying drawings disclosed in the present disclosure are not limit the technical spirit of the present disclosure, but are intended to illustrate the scope of the technical idea of the present disclosure, and the scope of the present disclosure is not limited by the form and the accompanying drawings.

The steps and/or operations according to the present disclosure may occur in different orders, or in parallel, or simultaneously in different exemplary forms for different epochs and the like as may be appreciated by those skilled in the art.

Depending on the exemplary form, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module," or "unit" discussed in the present specification may be implemented by software, firmware, hardware (e.g., a processor), and/or any combination thereof.

Meanwhile, the forms according to the present disclosure may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary forms have been described and illustrated in the drawings and the specification. The exemplary forms were chosen and described in order to explain certain principles of the disclosure and their practical application, to thereby enable others skilled in the art to make and utilize various exemplary forms of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the present disclosure.

What is claimed is:

1. A method of updating a control unit for a vehicle, the method comprising:
    generating raw difference data based on a comparison of an old version of data with a new version of data;
    generating divided difference data by dividing the raw difference data for each memory sector of a memory of the control unit; and
    updating the old version of data stored in the memory of the control unit to the new version of data utilizing the divided difference data,
    wherein generating the divided difference data includes:
        sequentially loading the raw difference data in an order of the memory sector;
        calculating an old version address and a new version address of the loaded raw difference data; and
        moving the loaded raw difference data to a memory sector corresponding to the new version address of the loaded raw difference data.

2. The method of claim 1, wherein the raw difference data includes same data, added data, changed data, and deleted data.

3. The method of claim 2, wherein the same data and the deleted data include size information, and the added data and the changed data include size information and data information.

4. The method of claim 1, wherein generating the divided difference data includes:
    further dividing overlapping data when the loaded raw difference data comprises the same data, the added data, or the changed data, and overlaps in two or more memory sectors.

5. The method of claim 1, wherein generating the divided difference data includes, in consideration of data moved to the memory sector, setting an order of difference release for each memory sector to a reverse order of the movement of the data.

6. The method of claim 5, wherein generating the divided difference data includes:
    setting a memory sector address of the old version of the data moved to the memory sector as a reference location of the old version.

7. The method of claim 6, wherein generating the divided difference data includes:
    adding the order of the difference release and the reference location of the old version of the data to the divided difference data.

8. The method of claim 1, wherein the memory sector is applied to a memory device different from a memory device of the old version and the raw difference data.

9. The method of claim 8, wherein the memory sector is a difference release buffer, and is formed of a flash memory or a Static Random Access Memory (SRAM).

10. The method of claim 1, wherein updating the old version of the data to the new version of the data includes:
    obtaining an address value of the old version of the data by referring to a reference location of the old version of the data in order to perform difference release on the divided difference data;
    obtaining a start address of a difference release buffer in which the divided difference data is stored as an address value of the new version of the data; and
    performing difference release on the divided difference data according to the data type of the divided difference data, the address value of the old version, and the address value of the new version.

11. The method of claim 10, wherein performing the difference release includes:
    performing the difference release on the divided difference data based on a predetermined order of difference release.

12. The method of claim 10, wherein updating the old version to the new version includes:
    when the data type of the divided difference data is the same data, increasing the address value of the old version and the address value of the new version by a size of the same data.

13. The method of claim 10, wherein updating the old version to the new version includes: when the data type of the divided difference data is the added data, increasing the address value of the new version by a size of the added data.

14. The method of claim 10, wherein updating the old version to the new version includes: when the data type of the divided difference data is the changed data, increasing the address value of the old version and the address value of the new version by a size of the changed data.

15. The method of claim 10, wherein updating the old version to the new version includes: when the data type of the divided difference data is the deleted data, increasing the address value of the old version by a size of the deleted data.

16. The method of claim 1, wherein the old version and the raw difference data are stored in the same flash memory.

17. A method of updating a control unit for a vehicle, the method comprising:
    generating raw difference data based on a comparison of an old version of data with a new version of data;
    generating divided difference data by dividing the raw difference data for each memory sector of a memory of the control unit; and updating the old version of data stored in the memory of the control unit to the new version of data utilizing the divided difference data, wherein updating the old version of the data to the new version of the data includes:
- obtaining an address value of the old version of the data by referring to a reference location of the old version of the data in order to perform difference release on the divided difference data;
- obtaining a start address of a difference release buffer in which the divided difference data is stored as an address value of the new version of the data; and
- performing difference release on the divided difference data according to the data type of the divided difference data, the address value of the old version, and the address value of the new version.

18. The method of claim 17, wherein performing the difference release includes:
performing the difference release on the divided difference data based on a predetermined order of difference release.

19. The method of claim 17, wherein updating the old version to the new version includes:
when the data type of the divided difference data is the same data, increasing the address value of the old version and the address value of the new version by a size of the same data.

20. The method of claim 17, wherein updating the old version to the new version includes: when the data type of the divided difference data is the added data, increasing the address value of the new version by a size of the added data.

\* \* \* \* \*